May 19, 1925.
V. W. FRY
1,538,282
GUARD AND LEDGER PLATE FOR MOWERS
Filed July 23, 1923
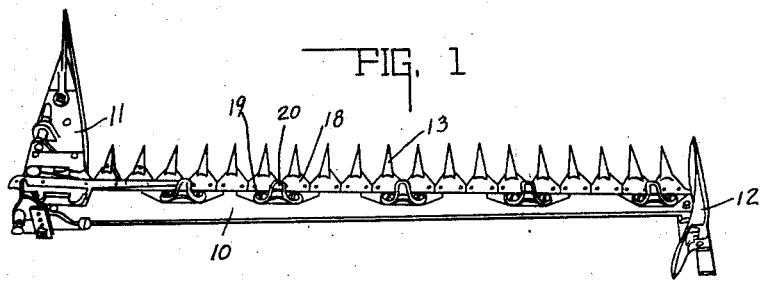
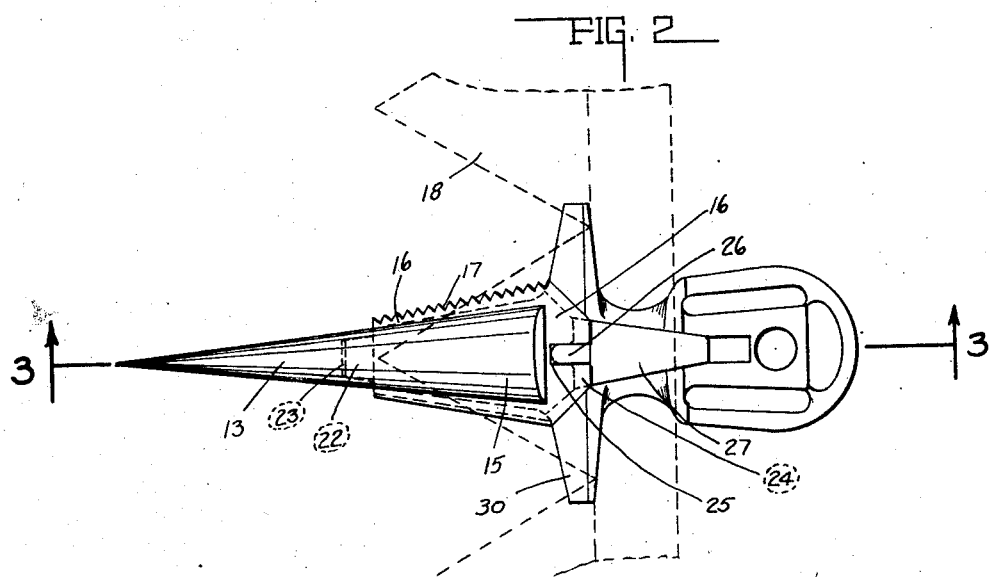
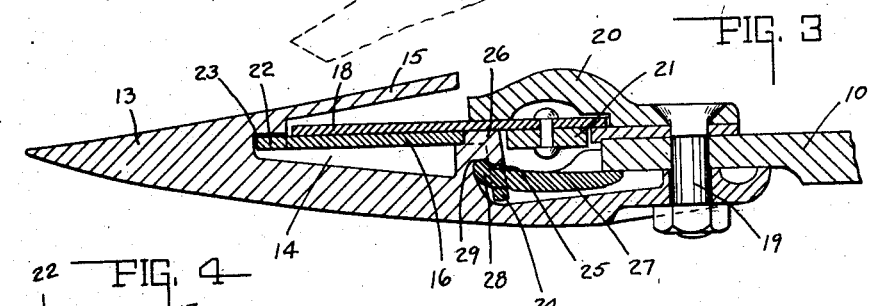
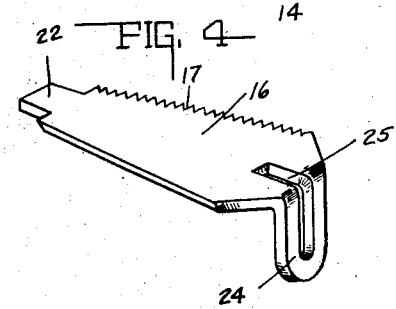
INVENTOR.
VIRGIL W. FRY.
BY
ATTORNEYS.

Patented May 19, 1925.

1,538,282

UNITED STATES PATENT OFFICE.

VIRGIL W. FRY, OF SANDBORN, INDIANA.

GUARD AND LEDGER PLATE FOR MOWERS.

Application filed July 23, 1923. Serial No. 653,252.

*To all whom it may concern:*

Be it known that I, VIRGIL W. FRY, a citizen of the United States, and a resident of Sandborn, county of Knox, and State of Indiana, have invented a certain new and useful Guard and Ledger Plate for Mowers; and I do hereby declare that the following is a full, clear, and exact description thereof, reference being had to the accompanying drawings, in which like numerals refer to like parts.

This invention relates to a ledger plate for mowers and particularly to the means for removably mounting and locking the ledger plate in the guard.

The usual structures of this type have been so made that when the ledger plate or lower shear wears out it is difficult to remove it and replace it with a new ledger plate. It is usually necessary for the operator to take the mower to a blacksmith for the purpose of having the ledger plate removed and a new one placed in position. This is not only expensive but troublesome and time consuming, particularly as a ledger plate is subject to rapid wear by reason of the upper shear or cutting knife reciprocating back and forth over it.

The principal feature of this invention resides in the locking means for the ledger plate, comprising a removable key adapted to rigidly wedge and lock the ledger plate in position when secured in place and permit its ready removal when released. By this means the operator only need remove the guard from the finger bar of the mower by removing the bolt securing them together, after which the key may be withdrawn and the ledger plate readily released.

The full nature of this invention will be understood from the accompanying drawings and the following description and claim.

In the drawings Fig. 1 is a perspective view of the usual finger bar of a mower machine. Fig. 2 is a plan view of the guard. Fig. 3 is a section taken on the line 3—3 of Fig. 2. Fig. 4 is a perspective view of the ledger plate.

In the drawings there is shown a finger bar 10 for mowers secured at one end in the usual way to the shoe 11 and at the other end to the outer shoe 12. Rigidly secured to the cutter bar there are a plurality of guards 13. The guard 13 comprises the usual tapered metal member provided with a slot or recess 14 forming the apron 15 for protecting the enclosed cutting blade from damage. The ledger plate or lower shear 16 is removably secured within the guard, as will be hereinafter described, and is provided with a sharp knife or saw tooth edge 17. The upper shears 18 are supported by the cutter bar and reciprocated longitudinally therewith so as to slide back and forth upon the ledger plate 16, as shown in Fig. 3, so as to provide a shear cut in conjunction therewith. The guard 13 is rigidly secured to the finger bar 10 by the bolt 19 which also secures thereto the clip or guide member 20. The end of said member 20 bears down on the upper shears 18 for maintaining the same in sliding contact with the ledger plate. The cutter bar 21 is secured to the under side of the upper shears for causing them to be reciprocated and guiding their movement with respect to the finger bar and guard 13, as shown in Fig. 3.

As contemplated in this invention, the ledger plate is provided with an end tongue 22 adapted to be inserted in the recess 23 provided therefor in the forward end of the recess 14 of the guard. The rear end of the ledger plate is provided with a downwardly turned portion 24 extending at right angles to the cutting edge and provided with a slot 25 which extends from near the lower end of the portion 24 centrally thereof into the horizontal portion for receiving therein the lug 26 formed integral with the guard 13. The lug 26 is of such size with respect to the slot 25, that there is an opening between said lug and the end of said slot of sufficient size to receive the key 27 which is inserted therethrough. The key 27 is provided with a head 28 adapted to extend into a suitable notch 29 and bear against the top thereof. By this arrangement when the outer end of the key 27 is forced downwardly the head 28 will bear up against the top of the notch 29 so that continued downward pressure of the outer end of the key will tend to force the portion 24 of the ledger plate downwardly and secure it rigidly in place.

This construction is such that when the guard 13 is removed from the finger bar 10, the key 27 will be released and may be readily removed from engagement with the ledger plate, whereby the ledger plate may be removed from the guard. Upon mounting the ledger plate in place, the end tongue 22 is inserted in the recess and the rear portion of the ledger plate is then dropped over the lug 26. The key is inserted in position and forced down, wedging the plate securely in the guard, in which position it is held and further tightened by the engagement of the rear end of the key with the forward end of the bar 10 when the guard is secured thereto by the bolt 19.

It will be noted from the above that as the ledger plate is worn down by the reciprocating movement of the upper shear thereon, the lugs 26 and also the side bearing arms 30 will likewise be worn. When the ledger plate needs replacement it may be removed as above described and a new plate inserted therefor and securely fixed in place by the operator without the necessity of having any other tools than the wrench, and the thickness of the new ledger plate will cause its upper surface to lie above the surface of the lug 26 and side bearing arms 30. This, however, need have no effect upon the operation of the mower or the function of the ledger plate, so that the entire wear will thereafter be upon the ledger plate alone until it is worn down to the same level to which the lug 26 and the arms 30 have been worn.

The invention claimed is:

In a cutter mechanism the combination with a finger bar and guard having an opening, of a ledger plate with an opening and adapted to be inserted in said guard, a projection on the end of said ledger plate adapted to be inserted in the guard opening, a lug on said guard adapted to extend through the ledger plate opening, said lug having a recess formed thereunder, a removable key having an upwardly curved head thereon adapted to extend through the opening in said ledger plate, bearing firmly against the lower edge thereof and extending into said recess, and means for clamping said guard and finger bar to each other so as to cause said finger bar to engage the rear end of said key and force it downwardly against the lower edge of said ledger plate thereby causing said head to be forced upwardly and wedged in the recess in said guard so as to draw said ledger plate downwardly and hold it firmly therein.

In witness whereof, I have hereunto affixed my signature.

VIRGIL W. FRY.